March 16, 1971     M. S. NEIFELD ET AL     3,570,066
PLANT FOR FORMING CORRUGATED SHEETS FROM
FLAT ASBESTOS-CEMENT BLANKS Filed June 19, 1968     6 Sheets-Sheet 1

United States Patent Office 3,570,066
Patented Mar. 16, 1971

3,570,066
PLANT FOR FORMING CORRUGATED SHEETS FROM FLAT ASBESTOS-CEMENT BLANKS
Mark Solomonovich Neifeld, Ul. A. Tolstogo 26, kv. 20; Pavel Samuilovich Moroz, Ul. Mnevniki 14, kv. 65; Oleg Alexandrovich Morgunov, Jugo-Zapad, kvartal 38, korp. 165, kv. 43; and Savely Aronovich Monastyrenko, Proezd Rusanova 27, korp. 2, kv. 33, all of Moscow, U.S.S.R.
Filed June 19, 1968, Ser. No. 738,348
Int. Cl. B29c *17/02*
U.S. Cl. 18—19
8 Claims

ABSTRACT OF THE DISCLOSURE

Apparatus for forming corrugated sheets from flat asbestos-cement blanks is provided with a first system of endless chains for preforming the flat blanks, and a second system of endless chains for finishing the formation of the preformed blanks. Each system includes an upper and lower row of chains. The first system of upper and lower chains vertically and horizontally converge toward one another and the second system of chains are parallel to one another.

---

Figure 1:
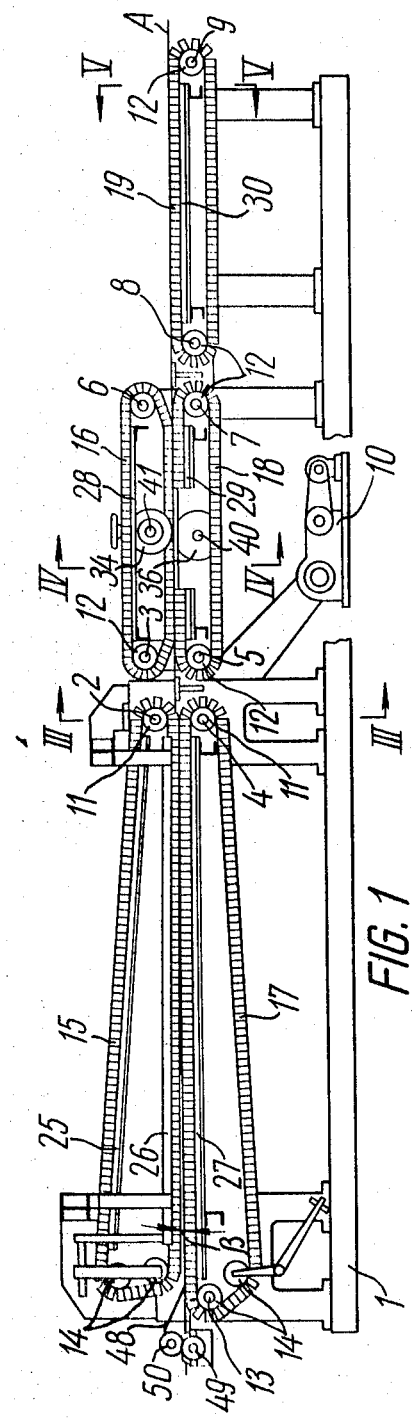

This invention relates to manufacturing plants for forming corrugated sheets from flat asbestos-cement blanks.

Known in the art are manufacturing plants for this kind of work having converging flexible endless working tools, one group of the working tools being displaced with relation to the other.

The converging arrangement of the working tools results in different conditions for corrugation in the front and rear parts of the blank which results in a partial straightening of the rear sheet portion in the course of leaving the plant.

Moreover, the known plants do not provide reliable means for securing the corrugated sheet after it leaves the plant and therefore fail to provide the required accuracy for trimming the longitudinal edges of prescribed article. For these reasons the sheets produced by said plants fail to meet the requirements of shape and geometrical dimensions.

An object of the invention is to obviate the aforesaid disadvantages.

The main object of the invention resides in providing a plant for forming corrugated sheets from flat asbestos-cement blanks which meet prescribed requirements of shape and geometrical dimensions.

This object is effected by providing a plant for forming corrugated sheets from flat asbestos-cement blanks in which two rows of parallel flexible working tools, are supported behind flexible endless working tools in the direction of blank feed, the drive shafts of said tools having horizontal axes of rotation. According to the invention said tools are installed one above the other, with a lateral displacement of half the pitch to press the blank which has already been preliminarily formed by the converging flexible working tools, to the size of the finished article.

Roller chains can serve as flexible endless converging and parallel working tools, the converging chains carrying forming elements with the working surface which corrugates the blank, the parallel chains carrying pressing elements.

It is practicable to support stationary calibrating elements between the upper runs of the lower parallel chains.

It is also practicable to support opposite each extreme upper parallel chain at least one device for trimming the longitudinal edges of the article.

The upper runs of the converging and parallel chains as well as the lower runs of the upper chains in the plant may rest on stationary guides.

It is practicable to support the lower runs of the upper parallel chains by calibrating elements.

The guides on which the upper runs of the parallel chains rest, can be secured on the frame with a provision for displacement thereof in the vertical plane.

It is practicable to provide the device for trimming the longitudinal edges of the article with a disc cutter rotatable about the horizontal axis and installed above a power-driven drum which supports the edge of the sheet. The axis of rotation of said drum is arranged horizontally and behind the axis of rotation of the disc of the cutter cutting the article edge, the distance between said axes being equal to the thickness of the article.

The edge of the article is pressed against a stationary table by the endless drive chain carrying hold-down elements.

The device for trimming the longitudinal edges in the plant can be embodied in a different manner, that is with the power-driven disc cutter supported above the stationary table and a power-driven drum mounted in front of said table (in the direction of feed), said drum having a horizontal axis of rotation and intended to remove the trimmed-off edges of the articles, the edge of the article being preliminarily formed from above and below by the endless power-driven chains carrying the forming elements.

It is practicable to support a device for receiving the finished articles behind the parallel endless working tools (in the direction of feed), said device having parallel endless power-driven chains and stationary eelments supporting the formed article from below and supported between the parallel chains.

The plant, according to the invention, considerably increases the quality of the manufactured articles.

Figure 2:
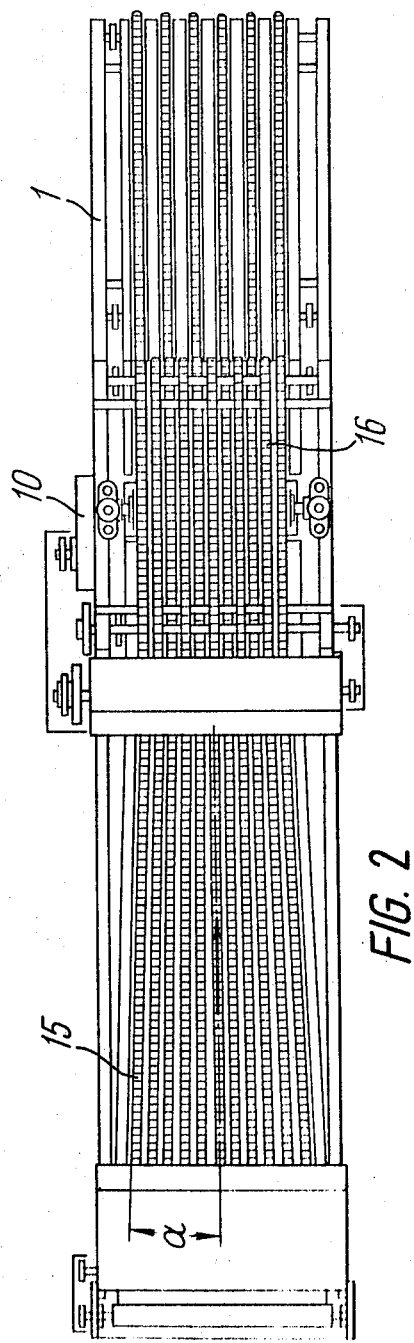
Figure 3:
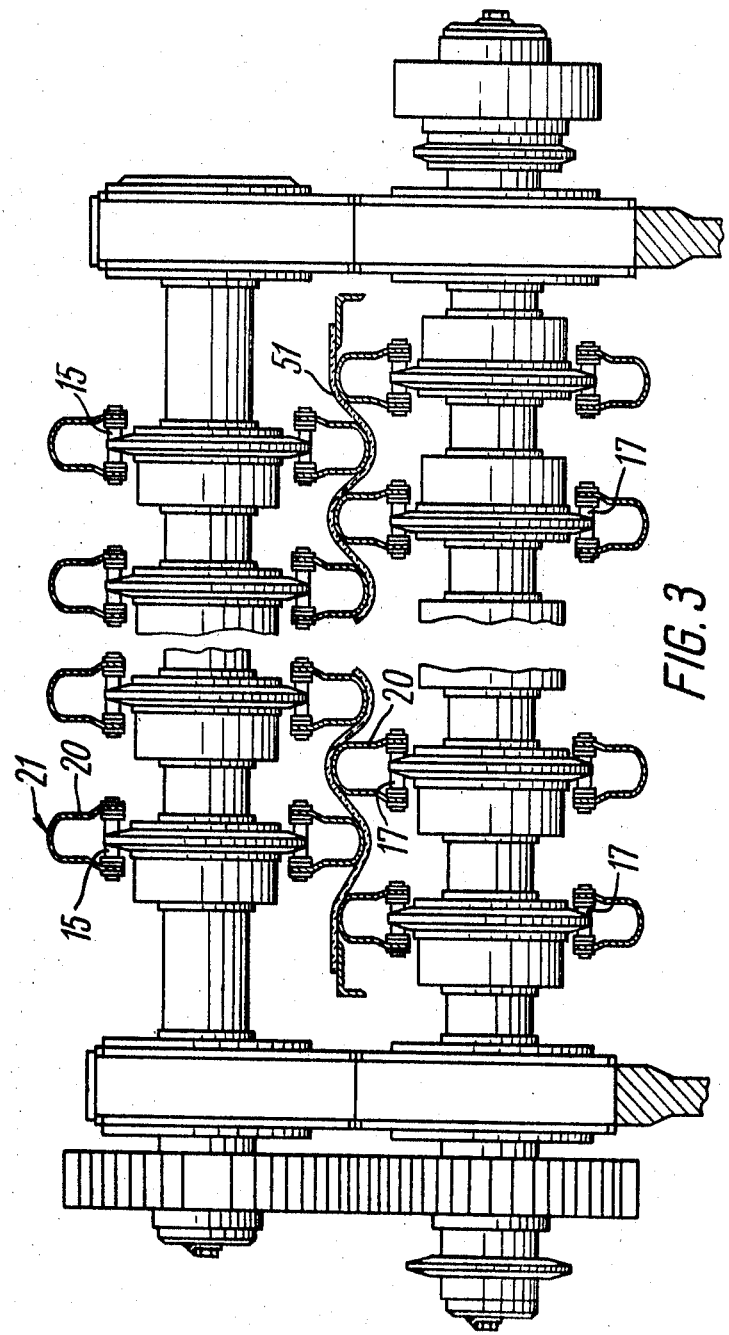
Figure 4:
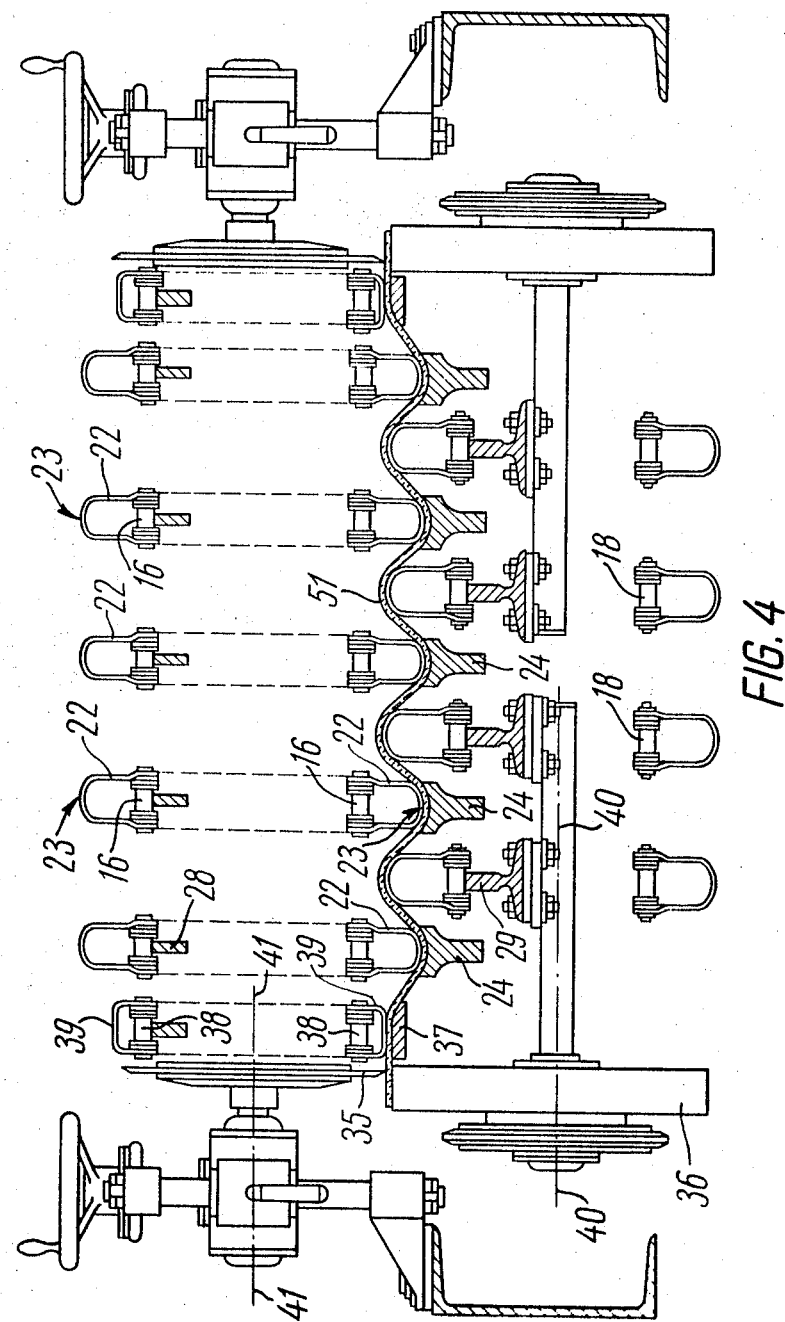
Figure 5:
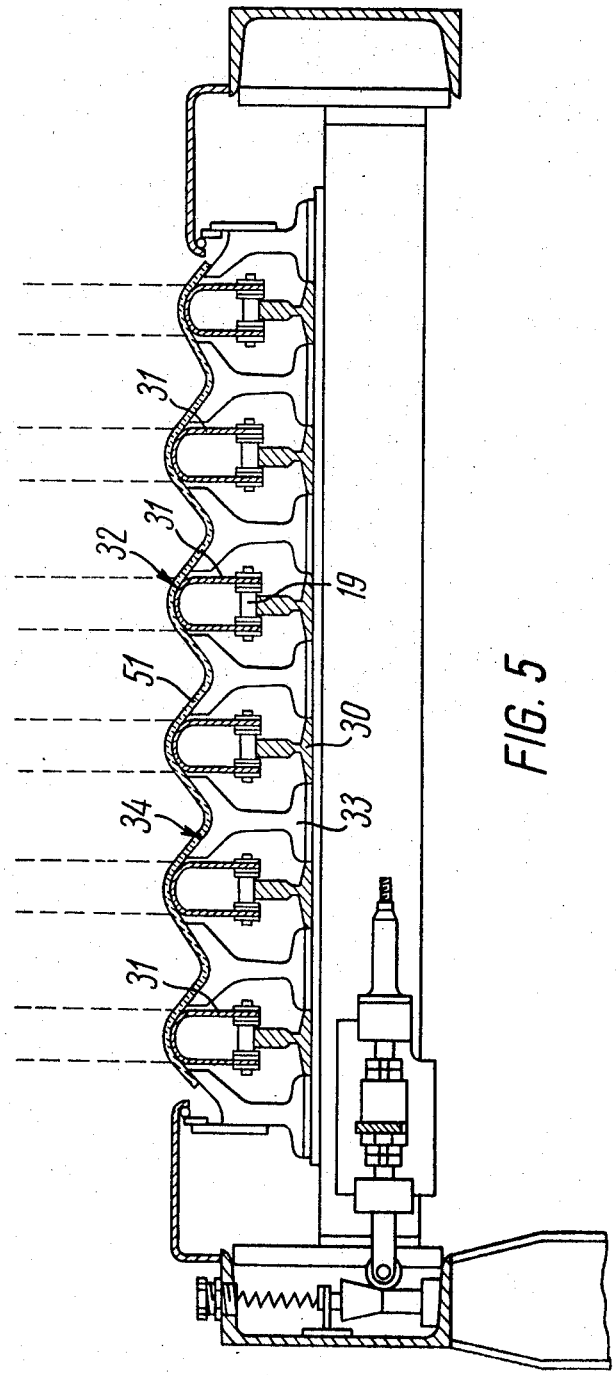
Figure 6:
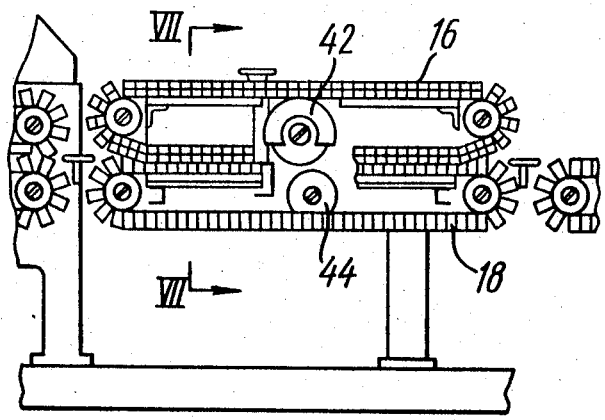
Figure 7:
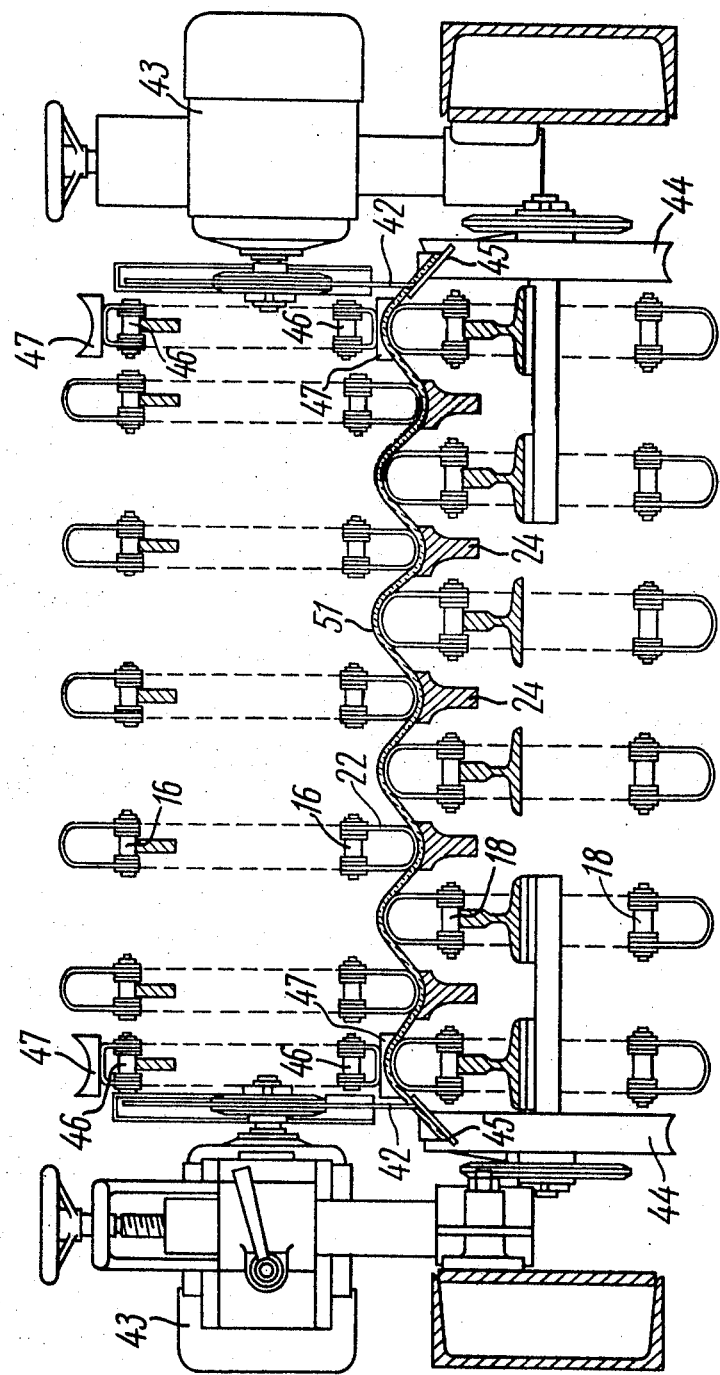

The invention will be further disclosed hereinafter by way of example with reference to the appended drawings of an embodiment of the plant, according to the invention; wherein:

FIG. 1 illustrates schematically a longitudinal section of a plant for forming corrugated sheets;
FIG. 2 shows a top view of the plant in FIG. 1;
FIG. 3 shows a section, taken along the line III—III of FIG. 1, enlarged;
FIG. 4 shows a section, taken along the line IV—IV of FIG. 1, enlarged;
FIG. 5 shows the same, a section, taken along the line V—V of FIG. 1, enlarged;
FIG. 6 illustrates a longitudinal section of parallel roller chains with a further embodiment of a device for trimming edges of the article.
FIG. 7 shows a section, taken along the line VII—VII of FIG. 6, enlarged.

The plant for forming corrugated sheets from flat asbestos-cement blanks illustrated in the drawings is mounted on a frame 1 (FIGS. 1 and 2), secured to which are the bearings of shafts 2, 3, 4, 5, 6, 7, 8 and 9 (FIG. 1) powered by a common electric drive 10 (FIGS. 1 and 2) and having horizontal axes of rotation.

Said driven shafts carry fixedly mounted sprockets 11 and 12 while the nondriven shaft 13 also carries rigidly mounted sprockets 14 which, together with the sprockets 11 and 12 carry the upper endless roller chains 15 and 16, and the identical lower chains 17, 18 and 19.

The roller chains 15 are located above an arbitrary horizontal plane A, horizontally in line, at an angle $$\alpha = 1.0\text{–}1.8°$$

to each other, in a pattern. The chains 17 are located below the plane A analogously to the chains 15, though being displaced relative to them. There is an angle $$\beta = 0.75 - 1.5°$$

between the lower runs of the chains 15 and the upper runs of the chains 17.

Located behind the converging chains 15 and 17 are the roller chains 16 and 18.

The chains 16 are located above the plane A and are parallel to one another; the chains 18 are also parallel to one another but are located between the chains 16, under the plane A. The parallel roller chains 19 are located behind the parallel chains 16 and 18, below the plane A.

Secured to the chains 15 and 17 are elements 20 (FIG. 3) with a smoothly curved (convex) working surface 21. Owing to the horizontal displacement of the chains 15 with relation to the chains 17 the working surface 21 of the elements 20 can corrugate a flat asbestos-cement blank moving between these chains.

The chains 16 and 18 are provided with elements 22 (FIG. 4) whose working surface 23 has a profile corresponding to that of the finished article.

Supported between the upper runs of the chains 18, directly under the elements 22 of the lower runs of the chains 16 are calibrating elements 24 with the profile of the working surface corresponding to that of the elements 22.

The length of the calibrating elements 24 is approximately equal to the distance between the axes of rotation of the shafts 3 and 5, 6 and 7.

The positions of the chains 15 and 17 is fixed by rigid guides. The upper runs of the chains 15 rest on the guides 25 (FIG. 1), the lower runs of chains 15 bear against the guides 26 and the upper runs of the chains 17 rest on the guides 27.

The upper runs of the chains 16 and 18 likewise rest on the guides 28 (FIG. 4) and 29, respectively, said guides being secured on the frame with a provision for vertical displacement.

The lower runs of the chains 16 rest on the calibrating elements 24.

The position of the chains 19 is fixed by rigid guides 30 (FIG. 5).

The chains 19 carry elements 31 with working surfaces 32, while stationary elements 33 are installed between the upper runs of these chains. The profile of the working surface 34 of the elements 33, together with the profile of the working surfaces 32 of the elements 31 constitute a complete profile of the formed (corrugated) article.

Near each extreme upper parallel chain 16 (FIG. 4) is supported a device for trimming the longitudinal edges of the article.

Said device can be realized in two embodiments. The first embodiment of the trimming device comprises a power-driven disc cutter 35, a power-driven drum 36, a stationary table 37 and a power-driven endless chain 38 located above the table and provided with securing elements 39. The axis of rotation 40—40 (FIG. 1) of the drum 36 is located horizontally and behind the axis of rotation 41—41 of the cutter 35 (in the direction of feed) the distance between them being equal to the thickness of the article.

The second embodiment of the device for trimming the edges of the article, consists of a disc cutter 42 (FIGS. 6 and 7) with a drive 43, a power-driven drum 44, a stationary inclined table 45 and power-driven endless chains 46 with forming elements 47.

The drum 44 (FIG. 6) is installed before the disc cutter 42 (in the direction of feed).

The plant for forming corrugated sheets operates as follows:

A preliminarily cut asbestos-cement blank is fed into the plant through a receiving unit 48 (FIG. 1) where it passes above an emulsion bath 49 and its lower surface is coated with emulsion by means of a roller 50.

The blank coated with emulsion is fed between the upper and lower systems of converging roller chains 15 and 17 which clamp the blank and move it as shown by the arrow in FIG. 2.

Owing to the horizontal relative displacement of said chains, the elements 20 (FIG. 3) fixed thereto corrugate the blank 51 with their working surface 21. Moreover, the elements 20 are so supported that the corrugated rib of the sheet is 5–10% higher and the developed length of said rib is 2–4% longer than specified in the normal characteristics of the profile of the corrugated sheet.

The preliminarily corrugated blank is then fed between the parallel chains 16 and 18 (FIG. 4), and, as the latter move, slides over the working surfaces of the calibrating elements 24. The elements 22 of the lower runs of the chains 16 press the blank with their own weight from above with their working surfaces 23 while the calibrating elements 24 simultaneously calibrate it with their working surfaces to a required profile of the corrugated sheet.

Trimming of the longitudinal edges of the article takes place concurrently with the above operations. The disc cutter 35 of the trimming device shown in FIG. 4 cuts off the edge of the article moving horizontally on the stationary table 37 and rotating drum 36 and held from above by the securing elements 39 of the power-driven endless chain 38.

The second embodiment of the device illustrated in FIGS. 6 and 7 first forms the longitudinal edge of the article by means of the elements 47 of the power-driven endless chain 46 and then trims off its edge resting on the stationary inclined table 45 with the disc cutter 42. The rotating drum 44 removes the trimmed edges. The second embodiment of the trimming device provides the finished articles with beveled edges.

The finished article is moved farther by the roller chains 19 (FIG. 5) being supported from below by the stationary elements 33. Owing to the fact that the profiles of the working surfaces 32 and 34 of the elements 31 and 33 correspond to the profile of the finished article, a freshly formed asbestos-cement article is prevented from undergoing a change in shape while moving to the discharge end of the plant.

What we claim is:

1. Apparatus for forming corrugated sheets from flat asbestos-cement blanks, said apparatus comprising a first upper row and a first lower row of flexible endless working tools, respective shafts supporting said first upper and lower rows of endless working tools, said shafts being supported horizontally and supporting said first upper row of endless working tools to vertically and horizontally converge towards one another in the direction of feed, each of the endless working tools in said first upper row being horizontally offset with respect to each respective endless working tool in said first lower row, said first upper and lower rows of endless working tools being operable to preform said flat asbestos-cement blanks, a second upper row and a second lower row of flexible endless working tools and further respective shafts supporting said second upper and lower rows of endless working tools parallel relative to one another, said further respective shafts being supported horizontally and supporting said second upper and lower rows of endless working tools adjacent said first upper and lower rows of endless working tools in the direction of feed, said second upper and lower rows of endless working tools being operable to form an article of finished dimensions from the preformed asbestos-cement blanks.

2. Apparatus according to claim 1, wherein the flexible endless working tools are each constituted by roller chains each having respective upper and lower runs; and further including forming elements secured to the converging chains, said forming elements having a working surface for corrugating the blanks, pressing elements secured to said chains of said second upper and lower rows, and stationary calibrating elements supported between the upper runs of the second lower row of chains and being operatively associated with said pressing elements.

3. Apparatus according to claim 2, including at least one device for trimming the longitudinal edges of the finished article, said device being supported proximate each longitudinal side of the second upper row of chains.

4. Apparatus according to claim 2, including guide means for supporting the upper runs of the first and second upper and lower rows of chains and the lower runs of the first upper row.

5. Apparatus according to claim 4, wherein the guides supporting the upper runs of the second row of chains are adjustably supported for vertical displacement.

6. Apparatus according to claim 1 including a device for receiving the finished articles supported adjacent the second rows of endless working tools, in the direction of article feed, said receiving device comprising endless power-driven chains supported parallel to one another, and stationary elements for supporting the finished article from below, said stationary elements being supported between the upper portions of said parallel power driven chains.

7. Apparatus according to claim 3, wherein the device for trimming the longitudinal edges of fiinished article comprises a disc cutter rotating around a horizontal axis; a power-driven drum supporting the edge of the article, installed under said disc cutter and having a horizontal axis of rotation which is located behind the axis of rotation of said disc cutter, the distance between said axes of rotation being equal to the thickness of the article; a stationary table, an endless power-driven chain; securing elements fastened to said endless chain and fixing the position of the edge of the article on said stationary table.

8. Apparatus according to claim 3, wherein the device for trimming the longitudinal edges of the article comprises a power-driven disc cutter; a stationary table supported under said cutter; a power-driven drum having a horizontal axis of rotation, said drum being supported before the disc cutter, as the article is fed; endless power-driven chains and forming elements fastened to said chains.

References Cited
UNITED STATES PATENTS

| | | | |
|---|---|---|---|
| 1,550,084 | 8/1925 | Lorenz | 18—19AUX |
| 2,182,720 | 12/1939 | Cannard | 18—19AUX |
| 2,335,313 | 11/1943 | Rowe et al. | 18—19AUX |
| 2,547,880 | 4/1951 | Meyer et al. | 18—19AUX |
| 2,655,196 | 10/1953 | Magnani | 18—19AUX |
| 2,876,824 | 3/1959 | West et al. | 18—19AX |
| 3,178,494 | 4/1965 | Tisdale | 18—19AX |
| 3,349,431 | 10/1967 | Rasmussen | 18—19AX |

ANDREW R. JUHASZ, Primary Examiner

Z. R. BILINSKY, Assistant Examiner